United States Patent
Huang

(10) Patent No.: US 10,631,300 B2
(45) Date of Patent: Apr. 21, 2020

(54) METHOD AND APPARATUS FOR DETERMINING COMMUNICATION BEAM

(71) Applicant: BEIJING XIAOMI MOBILE SOFTWARE CO., LTD., Beijing (CN)

(72) Inventor: Jiangtao Huang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 12 days.

(21) Appl. No.: 15/874,360

(22) Filed: Jan. 18, 2018

(65) Prior Publication Data

US 2018/0206218 A1 Jul. 19, 2018

(30) Foreign Application Priority Data

Jan. 18, 2017 (CN) .......................... 2017 1 0035919

(51) Int. Cl.
*H04W 72/04* (2009.01)
*H04B 7/06* (2006.01)
*H04W 48/16* (2009.01)
*H04W 72/02* (2009.01)
*H04W 24/02* (2009.01)
*H04W 16/28* (2009.01)
*H04W 88/02* (2009.01)

(52) U.S. Cl.
CPC ........ *H04W 72/046* (2013.01); *H04B 7/0695* (2013.01); *H04W 16/28* (2013.01); *H04W 24/02* (2013.01); *H04W 48/16* (2013.01); *H04W 72/02* (2013.01); *H04W 72/0486* (2013.01); *H04W 88/02* (2013.01)

(58) Field of Classification Search
CPC . H04W 72/02; H04W 72/042; H04W 72/046; H04W 7/063; H04W 7/0695; H04W 7/0626; H04W 7/088; H04W 72/0486; H04W 48/16; H04W 24/02; H04W 16/28; H04W 88/02; H04W 7/04; H04B 7/0695; H04B 7/0617; H04B 7/063; H04B 7/026; H04B 7/088; H04B 7/04
See application file for complete search history.

(56) References Cited

U.S. PATENT DOCUMENTS

| | | | |
|---|---|---|---|
| 2009/0285159 A1* | 11/2009 | Rezaiifar | H04W 72/0486 370/328 |
| 2013/0039345 A1 | 2/2013 | Kim et al. | |
| 2013/0051364 A1 | 2/2013 | Seol et al. | |
| 2013/0155847 A1 | 6/2013 | Li et al. | |

(Continued)

FOREIGN PATENT DOCUMENTS

| | | |
|---|---|---|
| EP | 3 280 068 A1 | 2/2018 |
| WO | WO 2016/165128 A1 | 10/2016 |

OTHER PUBLICATIONS

Partial European Search Report dated Apr. 23, 2018 in Patent Application No. 18152347.3, 21 pages.

*Primary Examiner* — George Eng
*Assistant Examiner* — Hung K Du
(74) *Attorney, Agent, or Firm* — Oblon, McClelland, Maier & Neustadt, L.L.P.

(57) ABSTRACT

The disclosure relates to a method and apparatus for determining a communication beam. The method includes receiving, via a user equipment, at least two beams; acquiring beam information of the received beams; selecting a target beam from the received beams based on the beam information; and transmitting information via the target beam.

4 Claims, 10 Drawing Sheets

(56) References Cited

U.S. PATENT DOCUMENTS

| | | |
|---|---|---|
| 2013/0258885 A1 | 10/2013 | Yu et al. |
| 2014/0056256 A1 | 2/2014 | Kim et al. |
| 2014/0080482 A1* | 3/2014 | Yasuoka .............. H04W 48/16 |
| | | 455/435.2 |
| 2016/0255458 A1* | 9/2016 | Huang .................. H04W 4/70 |
| | | 370/338 |
| 2017/0155432 A1 | 6/2017 | Kim et al. |
| 2018/0042000 A1* | 2/2018 | Zhang ..................... H04B 7/04 |
| 2019/0335522 A1* | 10/2019 | Zhang .............. H04W 74/0833 |

* cited by examiner

METHOD AND APPARATUS FOR DETERMINING COMMUNICATION BEAM

CROSS-REFERENCE TO RELATED APPLICATIONS

This application is based upon and claims priority to Chinese Patent Application Serial No. 201710035919.8, filed on Jan. 18, 2017, the entire contents of which are incorporated herein by reference.

TECHNICAL FIELD

The present disclosure relates to the field of computer communication technology, and more particularly, to a method and an apparatus for determining a communication beam.

BACKGROUND

With the development of communication technology, wireless communication networks have been gradually evolving towards Fifth Generation (5G) wireless communication networks. The key of the 5G communication is the usage of beamforming technology. When a plurality of terminals exist in a coverage area of a beam, all these terminals are likely to select the same beam to access a network.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a method for determining a communication beam. The method includes receiving, via a user equipment, at least two beams; acquiring beam information of the received beams; selecting a target beam from the received beams based on the beam information; and transmitting information via the target beam.

According to an aspect of the disclosure, the beam information of the received beams is acquired under at least one of following triggering conditions: when the user equipment is ready to access a network; when the user equipment is in an idle state; when the user equipment receives beam scheduling information sent by a transmitting terminal of a first beam in case of accessing a network through the first beam; and when a signal intensity of a first beam is lower than a preset intensity threshold value, or when a signal descending rate of a first beam is higher than a preset rate threshold value, in case of the user equipment accessing a network through the first beam.

In an example, acquiring the beam information of the received beams includes acquiring a signal intensity and a beam identification of each of the received beams; arranging the signal intensities of the received beams in a preset order; and generating an intensity order list based on the arranged signal intensities.

In another example, selecting the target beam includes selecting one of the received beams with a largest signal intensity as the target beam based on the intensity ordered list.

In yet another example, selecting the target beam includes determining current state information of the user equipment; determining priorities of the received beams based on the current state information of the user equipment and the intensity ordered list; and selecting one of the received beams with a highest priority as the target beam.

According to an aspect of the disclosure, determining the current state information of the user equipment includes, when the user equipment selects a first beam with a currently strongest signal based on the intensity ordered list to connect to a network, determining network connection state information of the user equipment, and determining the priorities of the received beams includes, when the network connection state information indicates that network access fails, determining a second beam with a signal intensity second only to the first beam as the received beam with the highest priority based on the intensity ordered list.

According to another aspect, determining the current state information of the user equipment includes, when the user equipment transmits data through a first beam, determining data transmission state information of the user equipment, and wherein determining the priorities of the received beams includes when the data transmission state information indicates that a current data transmission state is lower than a preset threshold value, re-determining the priorities of the received beams based on the intensity ordered list.

In an example, re-determining the priorities of the received beams includes determining a second beam with a signal intensity second only to the first beam as the received beam with the currently highest priority based on the intensity ordered list.

In another example, re-determining the priorities of the received beams includes receiving a set of beams to be selected sent by a transmitting terminal of the first beam; matching the intensity ordered list based on the set of beams to be selected so as to obtain a matching result; and determining a received beam with a currently highest priority based on the matching result.

In yet another example, determining the priorities of the received beams further includes, when the first beam is still a received beam with a currently strongest signal, rejecting the first beam as the received beam with the highest priority within a preset time range.

Aspects of the disclosure also provide another method for determining a communication beam. The method includes receiving, via a beam transmitting terminal, a network connection request sent from a user equipment through a first beam; determining a current load of the first beam; when the current load of the first beam exceeds a preset threshold value, rejecting the network connection request; and when the current load of the first beam does not exceed the preset threshold value, establishing a communication connection between the transmitting terminal and the user equipment through the first beam.

In an aspect of the disclosure, the method further includes, when a data transmission state of a user equipment through a data transmission link of the first beam is lower than a preset threshold value, detecting a load condition of each beam; acquiring a set of beams to be selected including of a group of beam identifications of available beams based on the load condition of each beam; and sending the set of beams to be selected to the user equipment, such that the user equipment reselects a target beam based on the set of beams to be selected.

Aspects of the disclosure also provide an apparatus for determining a communication beam. The apparatus includes a processor and a memory for storing instructions executable by the processor. The processor is configured to receive, via a user equipment, at least two beams; acquire beam information of the received beams; select a target beam from the received beams based on the beam information of the received beams; and transmit information via the target beam.

Aspects of the disclosure also provide another apparatus for determining a communication beam. The apparatus includes a processor and a memory for storing instructions executable by the processor. The processor is configured to receive, via a beam transmitting terminal, a network connection request sent from user equipment through a first beam; determine a current load of the first beam; when the current load of the first beam exceeds a preset threshold value, reject the network connection request; and when the current load of the first beam does not exceed the preset threshold value, establish a communication connection between the transmitting terminal and the user equipment through the first beam.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the present disclosure and, together with the description, serve to explain the principles of the present disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of illustrative aspects do not represent all implementations consistent with the present disclosure. Instead, they are merely examples of apparatuses and methods consistent with aspects related to the present disclosure as recited in the appended claims.

The terms used herein are merely for describing a particular aspect, rather than limiting the present disclosure. As used in the present disclosure and the appended claims, terms in singular forms such as "a", "said" and "the" are intended to also include plural forms, unless explicitly dictated otherwise. It should also be understood that the term "and/or" used herein means any one or any possible combination of one or more associated listed items.

It should be understood that, although it may describe information with a term first, second, or third, etc., the information is not limited by these terms. These terms are merely for distinguishing among information of the same kind. For example, without departing from the scope of the present disclosure, a first information may also be referred to as a second information. Similarly, a second information may also be referred to as a first information. Depending on the context, a term "if" as used herein can be interpreted as "when", "where" or "in response to".

Figure 1A:
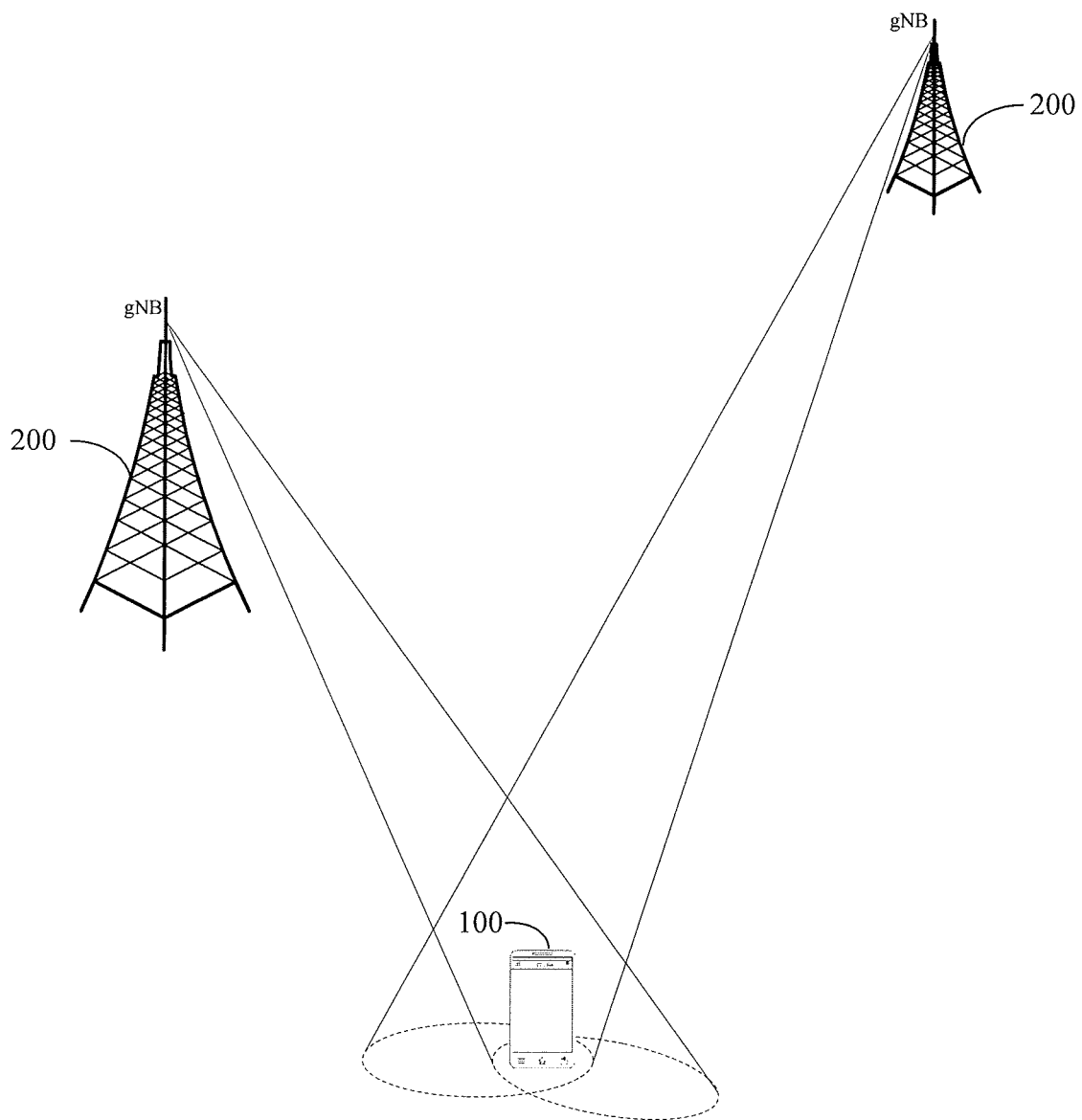
FIG. 1A is a schematic diagram of a scenario of determining a communication beam according to an exemplary aspect of the present disclosure.

The method for determining a communication beam provided by the present disclosure is applied to a 5G network or a network communication system using a high frequency beam for communication in future. The above-mentioned high-frequency beam generally refers to a beam formed by an electromagnetic wave of a frequency band above 6 GHz. In the case of a 5G network communication system, the application scenario of the aspects of the present disclosure is that: one user equipment may receive two or more communication beams, which may be from the same transmitting terminal, such as a 5G base station gNB, or from different transmitting terminals. FIG. 1A is a schematic diagram of a scenario of determining a communication beam according to an exemplary aspect of the present disclosure. With reference to FIG. 1A, the user equipment 100 may simultaneously detect two received beams, and the above beams are from different 5G base stations 200, respectively.

In the aspects of the present disclosure, the involved execution subject may include a base station serving as a beam transmitting terminal and user equipment UE serving as a beam receiving terminal. In the aspects, the above beam transmitting terminal may be a base station, a sub base station, and the like. The user equipment UE may be a user terminal, a user node, a mobile terminal, a tablet computer, or other electronic devices with a mobile communication function. In a particular implementing process, the base station and the user equipment are independent from each other while communicated with each other, and they achieve the technical solutions provided by the aspects of the present disclosure together. Hereinafter, a method for determining a communication beam provided by the present disclosure will be described by taking the user equipment as an example.

Figure 2:
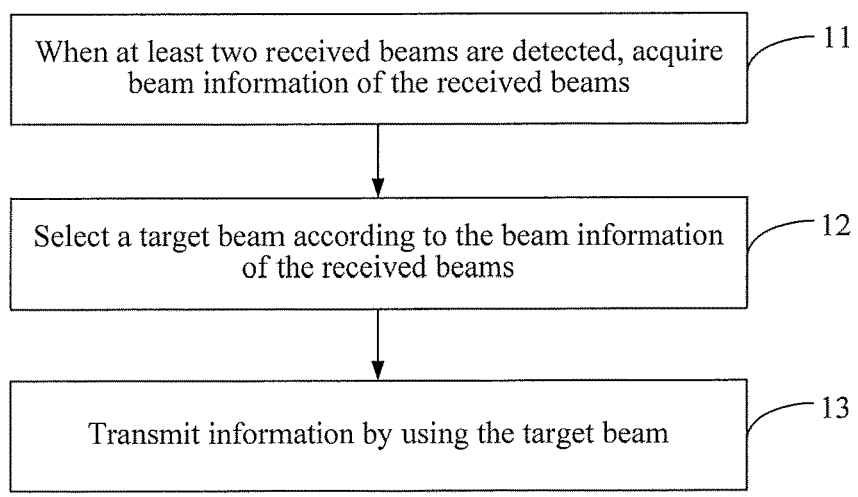
FIG. 2 is a flow chart of a method for determining a communication beam according to an exemplary aspect of the present disclosure.

FIG. 2 is a flow chart of a method for determining a communication beam according to an exemplary aspect. With reference to FIG. 2, the method is applied to user equipment, and may include following steps.

In step 11, when at least two received beams are detected, beam information of the received beams is acquired.

In the present disclosure, when one user equipment receives two or more communication beams at the same time, beam information of each received beam may be determined. In the present disclosure, each of the above-described beam information at least includes: a beam identification, and a signal intensity of the beam. In the aspect, the beam identification of the received beam may be determined based on a frequency or a wavelength of the beam.

In the present disclosure, when the user equipment receives a plurality of communication beams, the beam information of each received beam is acquired, so that the user equipment can reasonably select a target beam for accessing the network according to the above beam information, thus ensuring reliability of network connection of the user equipment, enhancing information transmission performance, and improving user experience of the user equipment.

With respect to the timing of acquiring the information of the received beam, the user equipment may maintain the detection of each received beam under an idle state. For example, the signal intensity of each received beam is periodically detected according to a preset time period, such as a preset time interval of 2 s, 3 s and etc.

The user equipment may also detect the beam information of each received beam under at least one of the following first, second and third triggering conditions.

The first triggering condition refers to: when the user equipment is ready to access the network.

For example, when the user equipment sends a network connection request through a randomly selected received beam, the detection of the received beam is triggered.

The second triggering condition refers to: in case of accessing a network through a first beam, when the user equipment receives beam scheduling information sent by a transmitting terminal of the first beam. The beam scheduling information is used to indicate the user equipment to measure the signal intensities of beams of other frequency points.

The user equipment in the 5G network supports the scheduling of the 5G base station gNB. That is, the user equipment may receive the beam scheduling information sent by the transmitting terminal (i.e., the 5G base station) of the first beam, when accessing the network through the first beam. The beam scheduling information is used to indicate that the user equipment may access the network through beams of other frequency points, to allow the user equipment to measure the signal intensities of the beams of other frequency points.

The third triggering condition refers to: in case of the user equipment accessing a network through a first beam, when a signal intensity of the first beam is lower than a preset intensity threshold value, or when a signal descending rate of the first beam is higher than a preset rate threshold value. For example, when the user equipment accesses the network through the first beam, it is detected that the signal intensity of the first beam is rapidly reduced below the preset intensity threshold value in a very short time.

In the present disclosure, the user equipment may acquire the beam information of the received beams when the user equipment is ready to access a network; when the user equipment is in an idle state; when the user equipment receives beam scheduling information sent by a transmitting terminal of a first beam in case of accessing a network through the first beam; when a signal intensity of a first beam is lower than a preset intensity threshold value, or when a signal descending rate of the first beam is higher than a preset rate threshold value, in case of the user equipment accessing a network through the first beam; or under other triggering conditions, so as to minimize the power consumption of detection of the beam, select the most reasonable communication beam to connect to the network timely and effectively as far as possible, and improve the network information transmission performance of the user equipment.

Figure 3:
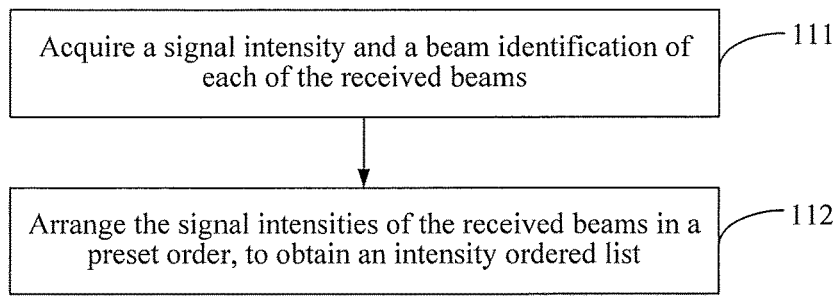
FIG. 3 is a flow chart of another method for determining a communication beam according to an exemplary aspect of the present disclosure.

FIG. 3 is a flow chart of another method for determining a communication beam according to an exemplary aspect. The above step 11 may include the following steps.

In step 111, a signal intensity and a beam identification of each of the received beams are acquired.

In a 5G network, the user equipment may detect the frequency point of each received beam according to a built-in antenna array, whereby the beam identification of the received beam may be represented as a corresponding wavelength or frequency of the frequency point. The user equipment may determine a signal intensity of each received beam through a built-in power monitoring module.

In the present disclosure, the correspondence relationship between the beam identifications and the signal intensities of the received beams may be recorded using a beam information list, as shown in Table 1:

TABLE 1

| Beam identification | Signal intensity |
|---|---|
| $f_1$ | $P_1$ |
| $f_2$ | $P_2$ |
| $f_3$ | $P_3$ |

Table 1 illustratively shows the relationship between the beam identifications and the signal intensities of three received beams. The beam identification of each received beam is represented by the frequency f of the frequency point of the received beam.

In step 112, the signal intensities of the received beams are arranged in a preset order, to obtain an intensity ordered list.

After the signal intensity of each received beam is determined, the signal intensity of each received beam may be ordered according to a preset order, for example, a descending order (from large to small) or an ascending order (from small to large). The signal intensity of each received beam is ordered so as to obtain the intensity ordered list.

In the present disclosure, after detecting a beam identification and a signal intensity of each received beam, the signal intensities of the received beams may be ordered in a preset order to obtain an intensity ordered list, which facilitates the user equipment to select the target beam more quickly, and improves the efficiency of selecting the communication beam.

By way of example, it is assumed that the three received beams as shown in Table 1 are arranged according to the descending order of the signal intensities, then the obtained intensity ordered list is as shown in Table 2.

TABLE 2

| Sequence number of intensity | Beam identification | Signal intensity |
|---|---|---|
| 1 | $f_2$ | $P_2$ |
| 2 | $f_1$ | $P_1$ |
| 3 | $f_3$ | $P_3$ |

In step 12, a target beam is selected according to the beam information of the received beams.

In an aspect of the present disclosure, when the user equipment is ready to access the network, a received beam with a largest signal intensity may be determined as a target beam directly according to the above intensity ordered list of the received beams. As shown in Table 2, the received beam with the beam identification of $f_2$ is determined as the target beam, thus ensuring the reliability of the network connection.

In the present disclosure, when the user equipment is ready to access a network, the user equipment may select a received beam with a largest signal intensity as a target beam according to the intensity ordered list, to ensure the reliability of the network connection of the user equipment.

Figure 4:
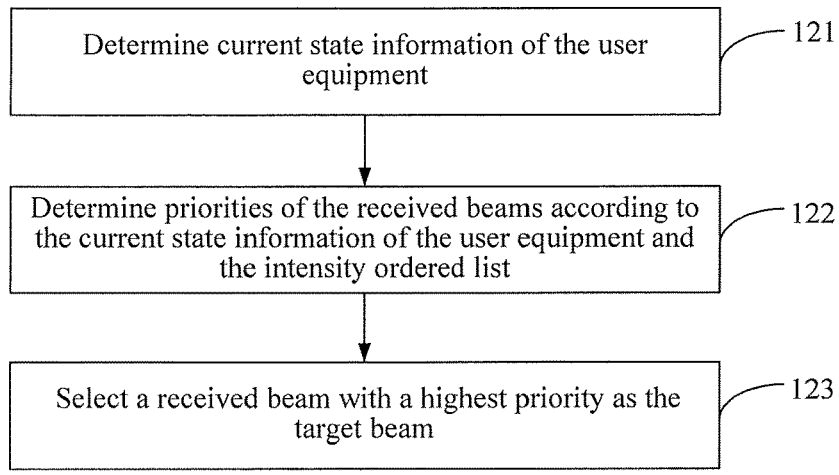
FIG. 4 is a flow chart of another method for determining a communication beam according to an exemplary aspect of the present disclosure.

In another aspect of the present disclosure, FIG. 4 is refereed to. FIG. 4 is a flow chart of another method for determining a communication beam according to an exemplary aspect of the present disclosure. The above step 12 may include the following steps.

In step 121, current state information of the user equipment is determined.

In the present disclosure, the current state information of the user equipment may be network connection state information or data transmission state information.

In the present disclosure, when determining the target beam, the selection of the beam may be performed by considering the current state information of the user equipment in combination with the above intensity ordered list, so as to avoid channel congestion of the communication beam due to that a plurality of user equipment access the network through the same communication beam, ensure that the user equipment has excellent information transmission performance, and further improve the user experience.

The network connection state information of the user equipment may be acquired during the process that the user equipment determines a beam to be selected to access the network. The above network connection state information may include: network connection success and network connection failure.

When the user equipment utilizes the selected beam for data transmission, data transmission state information may be acquired. The above data transmission state information is used to indicate a communication quality of the data transmission by the user equipment through the selected beam, which may be represented by a data transmission error probability or a preset level, such as good, moderate, poor, or the like.

In the aspects of the present disclosure, current state information of the user equipment may be detected in at least two following cases.

Figure 5A:
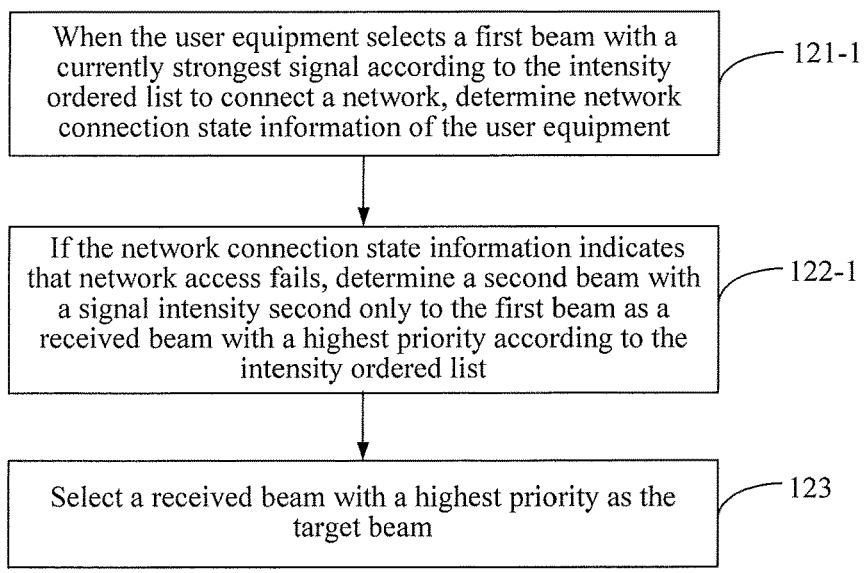
FIG. 5A is a flow chart of another method for determining a communication beam according to an exemplary aspect of the present disclosure.

In the first case, FIG. 5A referred to. FIG. 5A is a flow chart of another method for determining a communication beam according to an exemplary aspect. The above step 121 may be specifically embodied as follows.

In step 121-1, when the user equipment selects a first beam with a currently strongest signal according to the intensity ordered list to connect a network, network connection state information of the user equipment is determined.

Still taking the above table 2 as an example, the beam identification of the above first beam is $f_2$.

In the aspects of the present disclosure, when the user equipment selects a first beam with a largest signal intensity based on the above signal intensity list to connect the network, the network connection failure may occur or the network connection may be interrupted after accessing the network. For example, all responses to the network connection request continuously sent by the user equipment through the first beam are failed. At this time, it may be determined that the current network state information of the user equipment includes: the network connection failure, and the beam identification of the first beam.

Figure 1B:
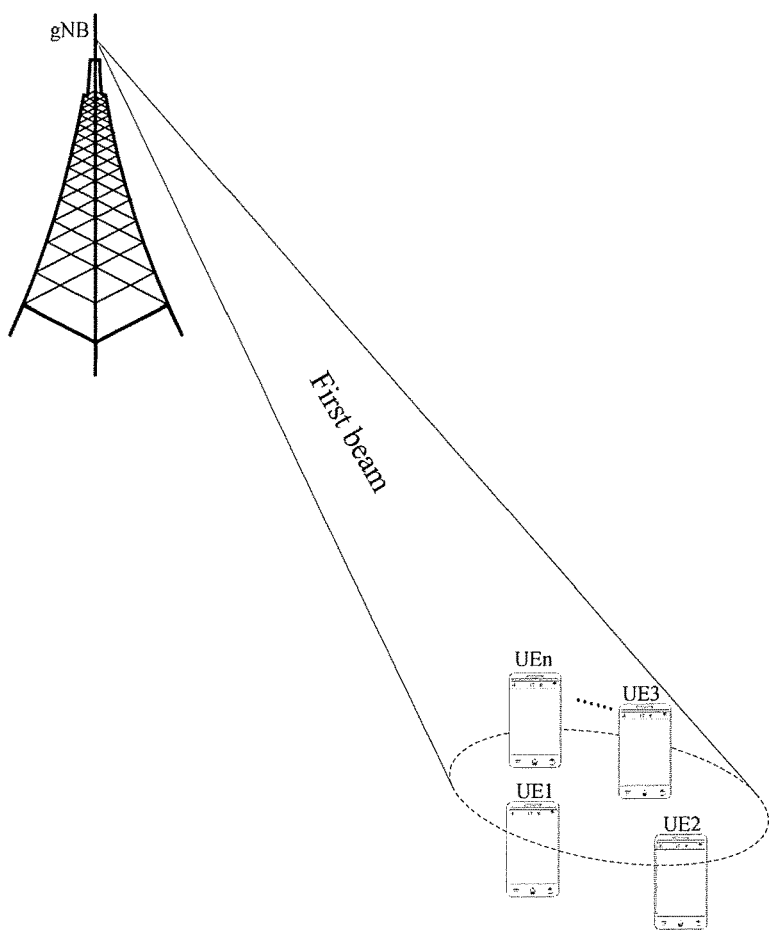
FIG. 1B is a schematic diagram of another scenario of determining a communication beam according to an exemplary aspect of the present disclosure.

The reason of the failure of network connection may be that the accessing devices within the coverage area of the first beam are too many, resulting in an overload of the first beam, and thus the transmitting terminal of the first beam rejects another more user equipment to access the network through the first beam. FIG. 1B is a schematic diagram of another application scenario of determining a communication beam according to an exemplary aspect. Referring to FIG. 1B, there may be a plurality of user equipment UEs which are accessing or waiting to access the network within the coverage area of the first beam, resulting in the overload of the first beam.

Figure 5B:
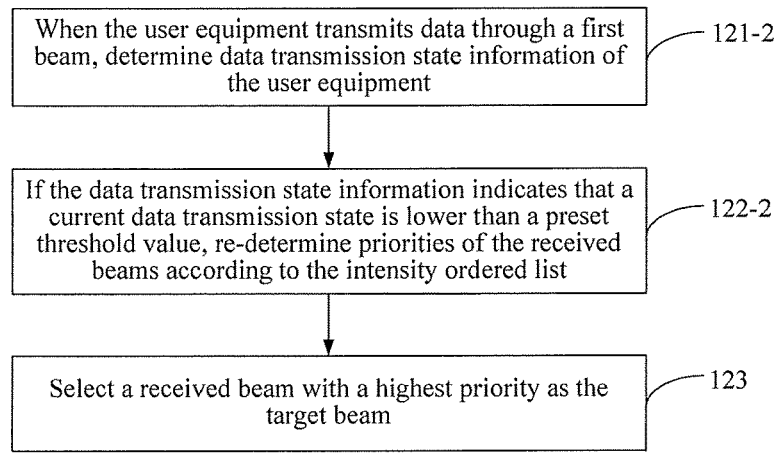
FIG. 5B is a flow chart of another method for determining a communication beam according to an exemplary aspect of the present disclosure.

In the second case, FIG. 5B is referred to. FIG. 5B is a flow chart of another method for determining a communication beam according to an exemplary aspect. The above step 121 may be specifically embodied as follows.

In step 121-2, when the user equipment transmits data through a first beam, data transmission state information of the user equipment is determined.

In the aspects of the present disclosure, the user equipment may monitor the data transmission condition of the data transmission link in real time after selecting the first beam with the largest signal intensity to access the network according to the above signal intensity list. For example, the data transmission rate may be monitored, the case where PDU (Protocol Data Unit) CRC (Cyclic Redundancy Check) error happens may be monitored, the case where HARQ (Hybrid Automatic Repeat reQuest) feedback information is NACK may be monitored, and the like.

In the aspect, the above Cyclic Redundancy Check is used to check whether data is altered or transmission error occurs in the data transmission process.

The above HARQ feedback information is information fed back to the base station when it is determined whether retransmission is required according to the analysis of the PDU after the user equipment acquires the PDU, such as a downlink sub-frame, transmitted by the downlink data transmission link. The HARQ feedback information transmitted by the user equipment to the base station includes NACK or ACK. When the above HARQ feedback information is NACK, it represents that the received data is error and the retransmission of data is requested. On the contrary, when the above HARQ feedback information is ACK, it represents that the received data is correct and no retransmission of data is required.

The current state information of data transmission through the first beam by the user equipment is determined according to the monitoring situation.

In step 122, priorities of the received beams are determined according to the current state information of the user equipment and the intensity ordered list.

In the present disclosure, in the application scenario described above, the user equipment not only selects the target beam simply according to the signal intensity, but also refers to the current state information in combination with the signal intensity of each received beam to determine the received beam with the highest priority currently, so as to select a more reasonable received beam for information transmission.

Referring to FIG. 5A, the above step 122 may include the following steps.

In step 122-1, if the network connection state information indicates that network access fails, a second beam with a signal intensity second only to the first beam is determined as a received beam with a highest priority according to the intensity ordered list.

If the beam identification of the first beam is $f_2$, then the second beam having a signal intensity next to the first beam and having an identification of $f_1$ is determined as a received beam with a highest priority, according to the above Table 2.

In the present disclosure, if the user equipment fails to select the first beam with the currently strongest signal to connect the network, a second beam with a signal intensity next to the first beam may be determined as a received beam with a highest priority according to the intensity ordered list, such that the user equipment determines the second beam as the target beam, thus ensuring that the user equipment smoothly accesses the network, and enhancing the network connection experience of the user equipment.

Correspondingly, referring to FIG. 5B, the above step 122 may include the following steps.

In step 122-2, if the data transmission state information indicates that a current data transmission state is lower than a preset threshold value, priorities of the received beams are re-determined according to the intensity ordered list.

For example, when the user equipment detects that the number of times of consecutive PDU CRCs exceeds a preset threshold value when the data is transmitted through the first beam; or, when the user equipment detects that the number of times of transmitting the NACK within a preset time period exceeds a preset threshold value, it may be determined that the current data transmission state is poor and the priority of the first beam needs to be re-determined.

In the present disclosure, when reselecting the target beam according to the above-described intensity ordered list, the user equipment may automatically re-determine the second beam with a signal intensity next to the first beam as the target beam, thus improving the intelligence degree of the user equipment for selecting the communication beam.

In step 122-2, the re-determining the priorities of the received beams according to the intensity ordered list includes at least two the following implementation manners.

In the first manner, if the signal intensity of the first beam is still the largest, the user equipment may determine a second beam with a signal intensity second only to the first beam as the received beam with a currently highest priority according to the intensity ordered list. This manner is similar to the step 122-1 described above, which will not be repeated herein.

Figure 6:
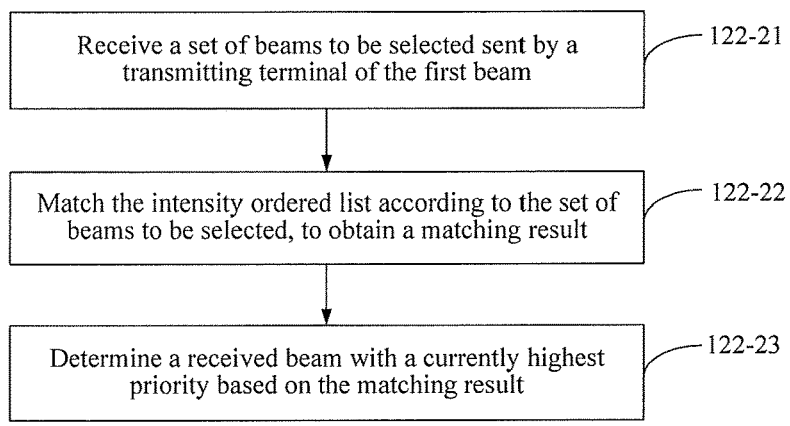
FIG. 6 is a flow chart of another method for determining a communication beam according to an exemplary aspect of the present disclosure.

In the second manner, FIG. 6 is referred to. FIG. 6 is a flow chart of another method for determining a communication beam according to an exemplary aspect. The re-determining the priorities of the received beams according to the intensity ordered list in step 122-2 may include the following steps.

In step 122-21, a set of beams to be selected sent by a transmitting terminal of the first beam is received.

In the present disclosure, when reselecting the target beam according to the above-described intensity ordered list, the user equipment may also receive a set of beams to be selected sent by a transmitting terminal of the first beam. Since the beam identification of the communication beam with excellent network performance currently is recorded in the set of beams to be selected, the user equipment may determine the received beam with excellent network performance currently as the target beam after matching the above intensity ordered list according to the above set of beams to be selected, thus improving the selection efficiency and effectiveness of the communication beam.

The above-described set of beams to be selected includes a part or all of the communication beam identifications detected by the transmitting terminal of the first beam. The communication beam represented by the communication beam identification described above may be a beam whose channel is unobstructed currently.

Although the data transmission state through the first beam currently is poor, the user equipment may still receive data sent by the transmitting terminal of the first beam, such as the base station A, via the downlink data transmission link of the first beam.

In the aspects of the present disclosure, the transmitting terminal of the first beam may actively transmit the set of beams to be selected to the user equipment when monitoring that the data transmission state for the user equipment is poor.

In particular, the transmitting terminal of the first beam may monitor the data transmission situation of each user equipment in the data transmission link. For example, the transmitting terminal of the first beam may determine the data transmission state according to the transmission situation of the Protocol Data Unit PDU for the user equipment, or the situation of the received NACK information.

It is assumed that the 5G base station A weighs the above data transmission state through the number of times of occurring PDU CRC errors during the data transmission. When the number of times of occurring consecutive CRC errors of the above PDU, such as the downlink sub-frame, exceeds a preset number of times, beam identifications of a group of beams are acquired according to a preset network layout protocol, and a set of beams to be selected is formed and transmitted to the user equipment through the first beam for the user equipment to select available beams therefrom.

in another aspect of the present disclosure, the transmitting terminal of the first beam may also send a set of beams to be selected to the user equipment in response to a request from the user equipment.

For example, when detecting that the number of times of occurring the PDU CRC errors in the uplink data transmission link carried by the first beam exceeds the preset threshold value, the user equipment may send a beam replacing request to the transmitting terminal, such as the base station A, of the first beam. After receiving the above-mentioned beam replacing request sent by the user equipment, the base station A may acquire and transmit the set of beams to be selected according to the above method.

In step 122-22, the intensity ordered list is matched according to the set of beams to be selected, to obtain a matching result.

It is assumed that the set of beams to be selected M acquired by the user equipment from the transmitting terminal of the first beam is represented as $\{f_3, f_4, f_5\}$.

The above-mentioned intensity ordered list is shown as Table 2. Then, Table 2 is matched according to the set M, and the outputted matching result is $f_3$.

It is to be noted that in another aspect of the present disclosure, the above matching result may also include 0 or at least two beam identifications.

In step 122-23, a received beam with a currently highest priority is determined based on the matching result.

In one aspect, if only one beam identification, such as $f_3$, is included in the above matching result, the received beam represented by the beam identification $f_3$ is determined as the beam with the highest priority currently.

In another aspect, if the above matching result includes at least two beam identifications, including, for example, $f_1$ and $f_3$, according to the intensity ordered list as shown in Table 2, since the signal intensity of the received beam $f_1$ is greater than that of the received beam $f_3$, the received beam represented by $f_1$ is determined as the beam with the highest priority currently.

In addition, in another aspect of the present disclosure, when the user equipment detects a failure of the network connection or a poor data transmission state under the first beam, the step 122 may further include the following step.

If the first beam is the received beam with a currently strongest signal, it is rejected to determine the first beam as the received beam with the highest priority within a preset time range.

In the present disclosure, after the user equipment selects the first beam, if it is found that it is unable to connect to the network through the first beam or the data transmission state is poor, even if the first beam is detected as a beam with the currently strongest signal, it is rejected to determine the first beam as the received beam with the highest priority within a preset time range upon re-determining the priority of the first beam, which effectively prevents the user equipment from selecting the first beam as the target beam, enhances the validity of the beam selection, improves the intelligent degree of the user equipment, and enhances the user experience of the user equipment.

In an aspect, the above preset time range may be a preset time period determined empirically, or a time range determined based on a data link load condition of the first beam. In this way, it is avoided that the user equipment selects the first beam as the target beam to access the network when the data transmission link of the first beam is congested, and on the basis of considering the signal intensities of the accessed beams, it also ensures that the user equipment effectively bypasses the communication beam whose corresponding channel is congested, thereby enhancing the user experience of the user equipment.

In step 123, a received beam with a highest priority is selected as the target beam.

In step 13, information is transmitted by using the target beam.

It can be seen that in the present disclosure, when the user equipment may simultaneously receive a plurality of communication beams, in one case, the user equipment may select the first beam with the strongest signal as the target beam for accessing the network according to the signal intensity information of each detected received beam, to ensure a reliable connection.

In another case, if the user equipment selects the first beam with the strongest signal but fails to access the network, or if the data transmission state is poor although the network is successfully accessed, the most reasonable communication beam may be reselected for the user equipment according to the current state information in combination with the intensity ordered list, to ensure the user equipment smoothly accessing the network and reliability of the data transmission, thereby enhancing the user experience of the user equipment.

Correspondingly, the present disclosure also provides a method for determining a communication beam, applied in a beam transmitting terminal. In the 5G network, a transmitting terminal, such as the 5G base station gNB, of the beam is provided with a large-scale antenna array. By adjusting the above-mentioned large-scale antenna array, the high-frequency electromagnetic waves may be propagated in a specific direction. That is, a communication beam is formed through the beamforming technique, to achieve directional sending and receiving of the information.

Figure 7:
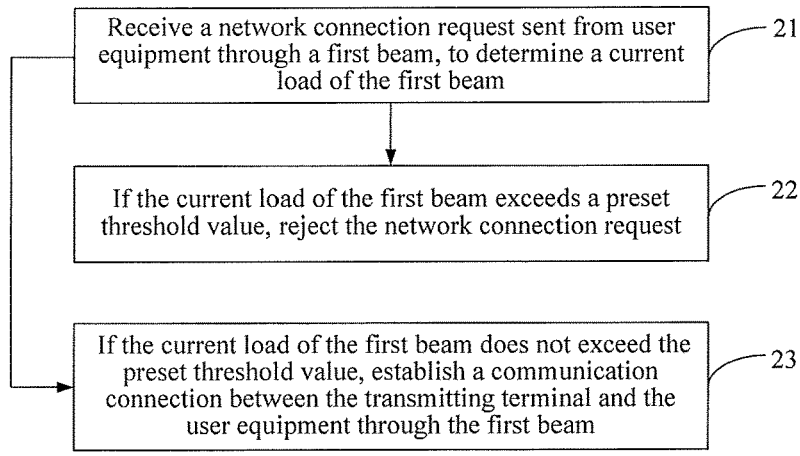
FIG. 7 is a flow chart of a method for determining a communication beam according to an exemplary aspect of the present disclosure.

FIG. 7 shows a method for determining a communication beam according to an exemplary aspect. Referring to FIG. 7, the method may include the following steps.

In step 21, a network connection request sent from user equipment through a first beam is received, to determine a current load of the first beam.

Corresponding to the step 121-1 in above FIG. 5A, after selecting the first beam, the user equipment may send a network connection request to a transmitting terminal, such as a 5G base station A, of the first beam through the first beam, so as to request to establish a communication connection with a 5G base station A through the first beam.

Upon reception of the above network connection request, the 5G base station A detects a current load condition of the first beam to determine whether the current load of the first beam exceeds a preset threshold value. If the current load of the first beam exceeds the preset threshold value, step 22 is performed; otherwise, step 23 is performed.

In step 22, if the current load of the first beam exceeds the preset threshold value, the network connection request is rejected.

As shown in FIG. 1B, when the user equipment sends a network connection request through the first beam, it is possible that a plurality of user equipment have accessed within the current coverage area of the first beam, causing overload of the first beam. If another more equipment accesses, the information transmission rate will be affected. Therefore, in this case, the 5G base station A may reject the above network connection request.

In step 23, if the current load of the first beam does not exceed the preset threshold value, a communication connection is established between the transmitting terminal and the user equipment through the first beam.

On the contrary, when the 5G base station A determines that the channel of the first beam has an excellent transmission performance currently and no congestion occurs, the above network connection request may be accepted.

Figure 8:
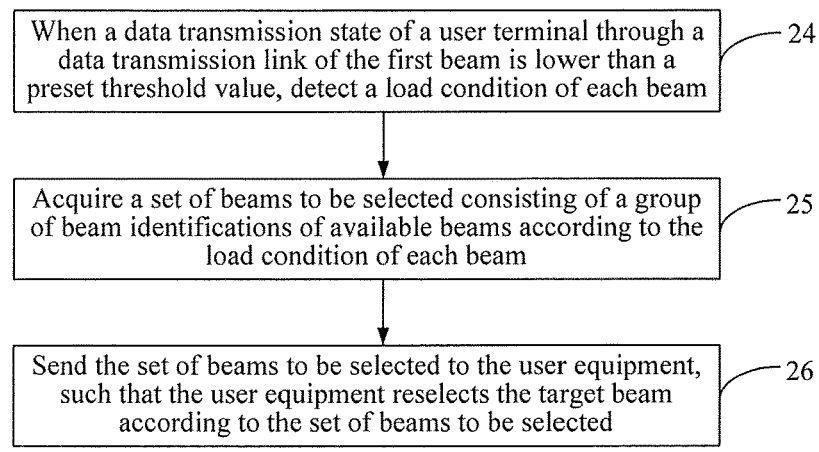
FIG. 8 is a flow chart of another method for determining a communication beam according to an exemplary aspect of the present disclosure.

FIG. 8 shows another method for determining a communication beam according to an exemplary aspect. Referring to FIG. 8, when the user equipment accesses the transmitting terminal through a first beam, the method may further include the following steps.

In step 24, when a data transmission state of the user terminal through a data transmission link of the first beam is lower than a preset threshold value, a load condition of each beam is detected.

Corresponding to one case of the above-described step 121-2, after the user equipment accesses the network through the first beam, the transmitting terminal, such as the 5G base station A, of the first beam may monitor a data transmission state for the user equipment. The data transmission state may include a data transmission state of an uplink data transmission link and that of a downlink data transmission link. In the aspects of the present disclosure, the uplink data transmission link refers to a data transmission link through which data is transmitted from the user equipment to the transmitting terminal, such as the 5G base station, of the communication beam; while the downlink data transmission link refers to a data transmission link through which data is transmitted from the transmitting terminal, such as the 5G base station, of the communication beam to the user equipment.

As described above, in the aspects of the present disclosure, the transmitting terminal of the first beam may determine the data transmission state of the first beam for the user equipment according to the condition of occurring PDU CRC error or the condition of receiving NACK information.

When the above data transmission state is lower than the preset threshold value, the detectable load condition of each communication beam may be acquired according to a preset network layout protocol.

In step 25, a set of beams to be selected consisting of a group of beam identifications of available beams is acquired according to the load condition of each beam.

The transmitting terminal of the first beam may determine which beams are excellent in data transmission performance currently, i.e., being available beams, according to the load condition of each communication beam, and then generate a set of beams to be selected, such as the above set M according to the beam identifications of the communication beams with superior data transmission performance.

In step 26, the set of beams to be selected is sent to the user equipment, such that the user equipment reselects a target beam according to the set of beams to be selected.

After the set of beams to be selected M is determined, the transmitting terminal, such as the 5G base station A, of the first beam sends the set of beams to be selected M to the user equipment through the first beam, for the user equipment to select the target beam therefrom.

With respect to each of the foregoing method aspects, for the sake of simplicity, it is described as a series of action combinations, but those skilled in the art will recognize that the present disclosure is not limited by the sequence of actions described, since according to the present disclosure, some steps may be performed in other orders or may be performed simultaneously.

It can be seen that through the method for determining the communication beam provided by the aspects of the present disclosure, congestion of a certain communication beam may be effectively avoided, thus improving the transmission performance of the communication beam. In addition, when a communication beam currently accessed by one user equipment is congested, it is also possible to acquire the beam identifications of other communication beams with excellent performance and inform them to the user equipment, such that the user equipment may reselect the communication beam targetedly, to ensure the data sending and receiving performance of the user equipment and enhance the user experience.

In the present disclosure, if the current data transmission state of the user equipment through the first beam is poor, the user equipment may reselect the target beam for data transmission according to the above-described intensity ordered list, thus ensuring the data transmission performance of the user equipment, and enhancing the information transmission experience of the user equipment.

In addition, it will be understood by those skilled in the art that all the aspects described in the specification belong to optional aspects and that the actions and modules involved are not necessarily essential to the present disclosure.

Corresponding to the above aspect of an application function implementing method, the present disclosure also provides aspects of an application function implementing apparatus and a corresponding terminal.

Figure 9:
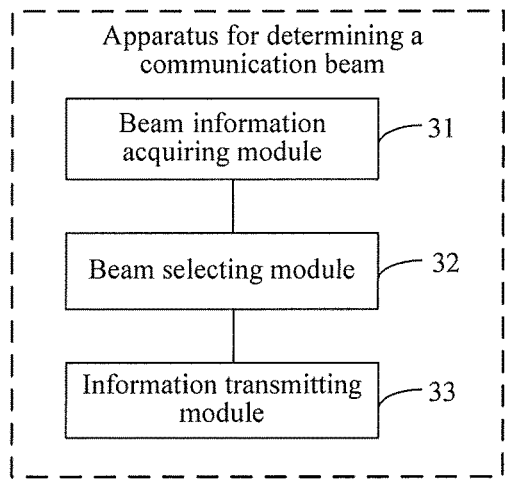
FIG. 9 is a block diagram of an apparatus for determining a communication beam according to an exemplary aspect of the present disclosure.

FIG. 9 is a block diagram of an apparatus for determining a communication beam according to an exemplary aspect, which may be provided in user equipment. With reference to FIG. 9, the apparatus may include: a beam information acquiring module 31, a beam selecting module 32 and an information transmitting module 33.

The beam information acquiring module 31 is configured to, when at least two received beams are detected, acquire beam information of the received beams.

In the aspects of the present disclosure, the beam information acquiring module 31 may acquire the beam information of the received beams under at least one of following triggering conditions:

when the user equipment is ready to access a network;

when the user equipment is in an idle state;

when the user equipment receives beam scheduling information sent by a transmitting terminal of a first beam in case of accessing a network through the first beam; and when a signal intensity of a first beam is lower than a preset intensity threshold value, or when a signal descending rate of the first beam is higher than a preset rate threshold value, in case of the user equipment accessing a network through the first beam.

The beam selecting module 32 is configured to select a target beam according to the beam information of the received beams.

The information transmitting module 33 is configured to transmit information by using the target beam.

Figure 10:
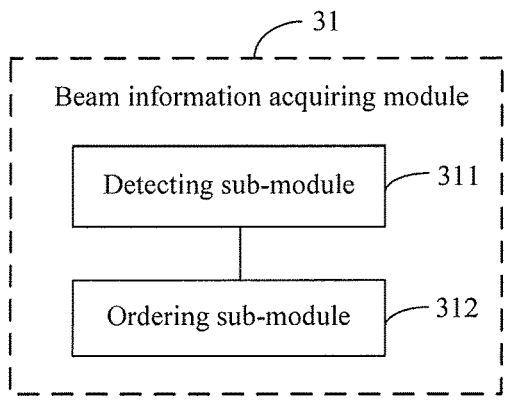
FIG. 10 is a block diagram of another apparatus for determining a communication beam according to an exemplary aspect of the present disclosure.

FIG. 10 is a block diagram of another apparatus for determining a communication beam according to an exemplary aspect. Referring to FIG. 10, on the basis of the apparatus aspect as shown in FIG. 9, the beam information acquiring module 31 may include: a detecting sub-module 311 and an ordering sub-module 312.

The detecting sub-module 311 is configured to acquire a signal intensity and a beam identification of each of the received beams.

The ordering sub-module 312 is configured to arrange the signal intensities of the received beams in a preset order, to obtain an intensity ordered list.

Figure 11:
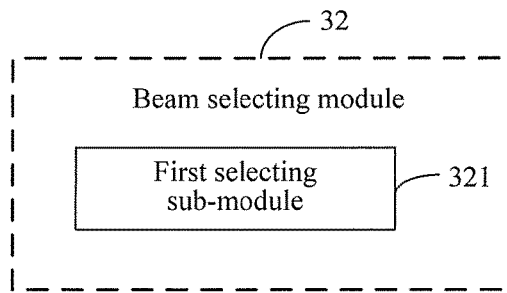
FIG. 11 is a block diagram of another apparatus for determining a communication beam according to an exemplary aspect of the present disclosure.

FIG. 11 is a block diagram of another apparatus for determining a communication beam according to an exemplary aspect. Referring to FIG. 11, on the basis of the apparatus aspect as shown in FIG. 9, the beam selecting module 32 may include a first selecting sub-module 321.

The first selecting sub-module 321 is configured to select a received beam with a largest signal intensity as the target beam according to the intensity ordered list.

Figure 12:
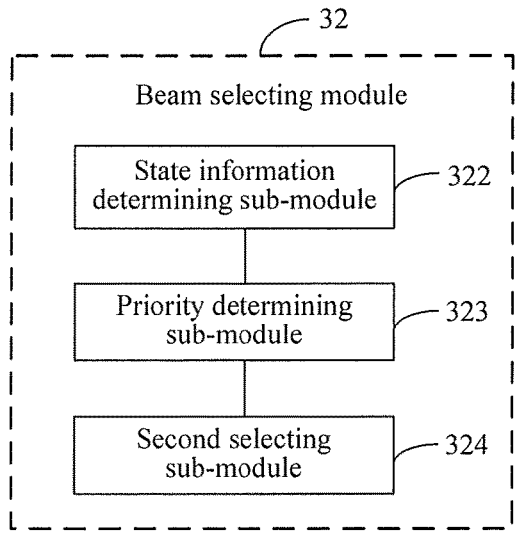
FIG. 12 is a block diagram of another apparatus for determining a communication beam according to an exemplary aspect of the present disclosure.

FIG. 12 is a block diagram of another apparatus for determining a communication beam according to an exemplary aspect. Referring to FIG. 12, on the basis of the apparatus aspect as shown in FIG. 9, the beam selecting module 32 may include: a state information determining sub-module 322, a priority determining sub-module 323 and a second selecting sub-module 324.

The state information determining sub-module 322 is configured to determine current state information of the user equipment.

The priority determining sub-module 323 is configured to determine priorities of the received beams according to the current state information of the user equipment and the intensity ordered list.

The second selecting sub-module 324 is configured to select a received beam with a highest priority as the target beam.

Figure 13:
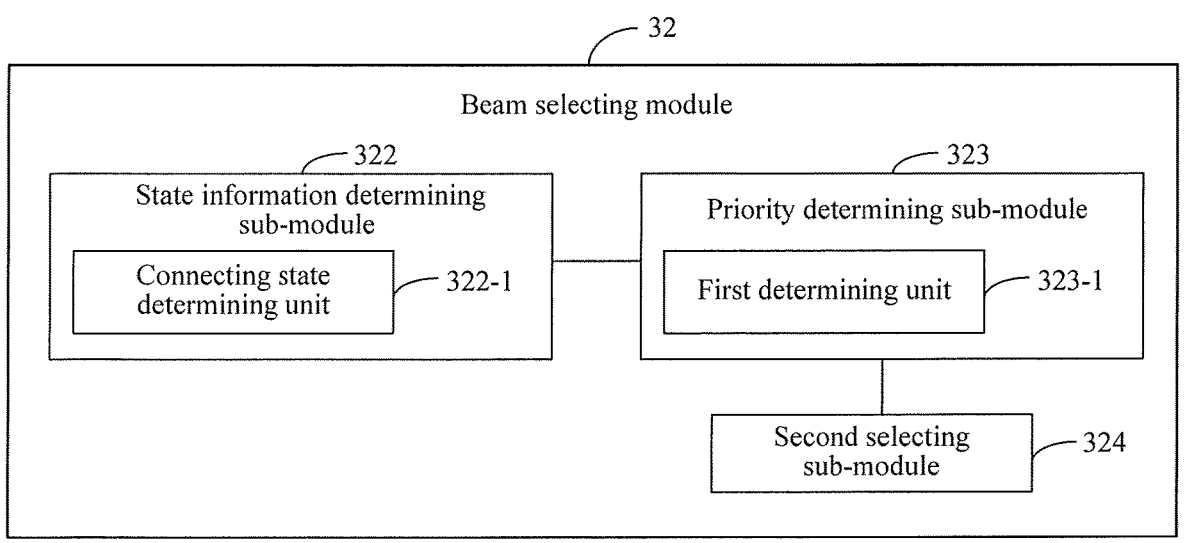
FIG. 13 is a block diagram of another apparatus for determining a communication beam according to an exemplary aspect of the present disclosure.

FIG. 13 is a block diagram of another apparatus for determining a communication beam according to an exemplary aspect. Referring to is referred to, on the basis of the apparatus aspect as shown in FIG. 12, the state information determining sub-module 322 may include a connecting state determining unit 322-1.

The connecting state determining unit 322-1 is configured to, when the user equipment selects a first beam with a currently strongest signal according to the intensity ordered list to connect a network, determine network connection state information of the user equipment.

The priority determining sub-module 323 may include a first determining unit 323-1.

The first determining unit 323-1 is configured to, when the network connection state information indicates that network access fails, determine a second beam with a signal intensity second only to the first beam as a received beam with a highest priority according to the intensity ordered list.

Figure 14:
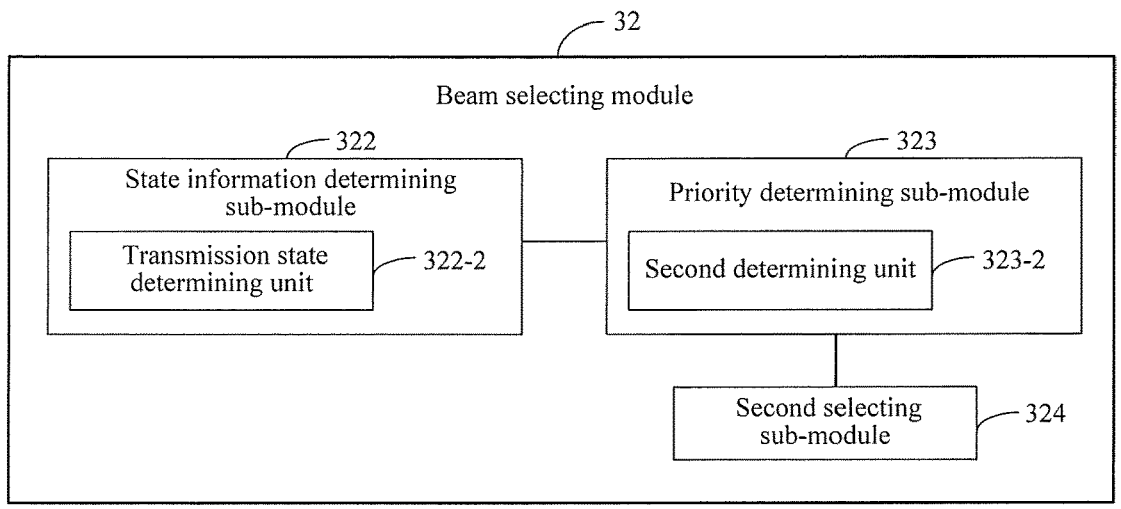
FIG. 14 is a block diagram of another apparatus for determining a communication beam according to an exemplary aspect of the present disclosure.

FIG. 14 is a block diagram of another apparatus for determining a communication beam according to an exemplary aspect. Referring to FIG. 14, on the basis of the apparatus aspect as shown in FIG. 12, the state information determining sub-module 322 may include a transmission state determining unit 322-2.

The transmission state determining unit 322-2 is configured to, when the user equipment transmits data through a first beam, determine data transmission state information of the user equipment.

The priority determining sub-module 323 may include a second determining unit 323-2.

The second determining unit 323-2 is configured to, when the data transmission state information indicates that a current data transmission state is lower than a preset threshold value, re-determine the priorities of the received beams according to the intensity ordered list.

Figure 15:
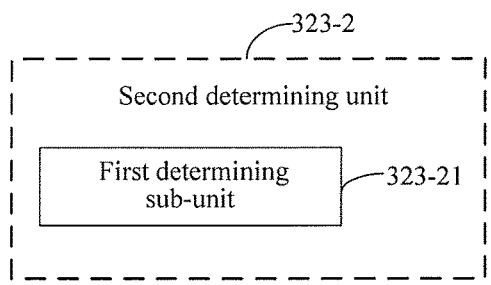
FIG. 15 is a block diagram of another apparatus for determining a communication beam according to an exemplary aspect of the present disclosure.

FIG. 15 is a block diagram of another apparatus for determining a communication beam according to an exemplary aspect. Referring to FIG. 15, on the basis of the apparatus aspect as shown in FIG. 14, the second determining unit 323-2 may include a first determining sub-unit 323-21.

The first determining sub-unit 323-21 is configured to determine a second beam with a signal intensity second only to the first beam as a received beam with a currently highest priority according to the intensity ordered list.

Figure 16:
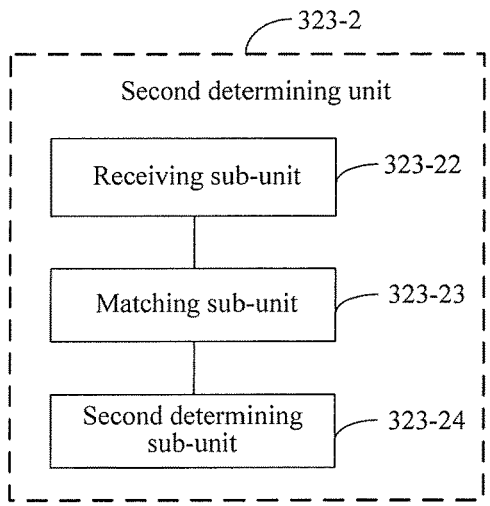
FIG. 16 is a block diagram of another apparatus for determining a communication beam according to an exemplary aspect of the present disclosure.

FIG. 16 is a block diagram of another apparatus for determining a communication beam according to an exemplary aspect. Referring to FIG. 16, on the basis of the apparatus aspect as shown in FIG. 14, the second determining unit 323-2 may include: a receiving sub-unit 323-22, a matching sub-unit 323-23 and a second determining sub-unit 323-24.

The receiving sub-unit 323-22 is configured to receive a set of beams to be selected sent by a transmitting terminal of the first beam.

The matching sub-unit 323-23 is configured to match the intensity ordered list according to the set of beams to be selected, to obtain a matching result.

The second determining sub-unit 323-24 is configured to determine a received beam with a currently highest priority based on the matching result.

Figure 17:
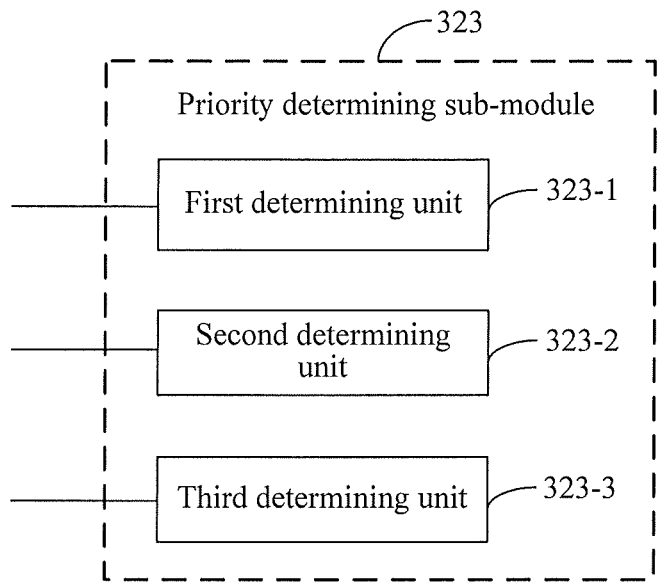
FIG. 17 is a block diagram of another apparatus for determining a communication beam according to an exemplary aspect of the present disclosure.

FIG. 17 is a block diagram of another apparatus for determining a communication beam according to an exemplary aspect. Referring to FIG. 17, on the basis of the apparatus aspects as shown in FIG. 13 and FIG. 14, the priority determining sub-module 323 may further include a third determining unit 323-3.

The third determining unit 323-3 is configured to, when the first beam is still the received beam with the currently strongest signal, reject to determine the first beam as the received beam with the highest priority within a preset time range.

Figure 18:
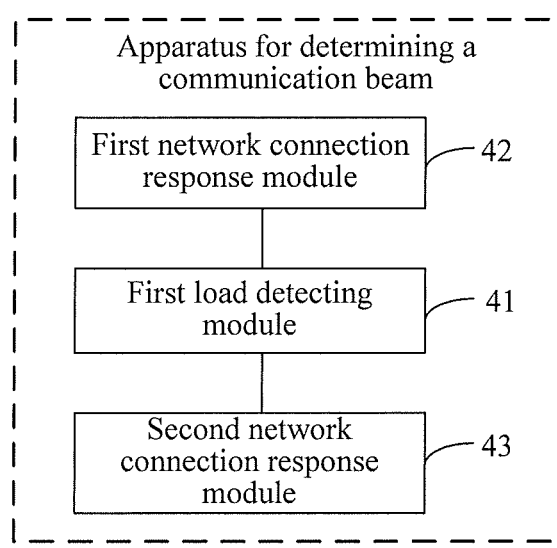
FIG. 18 is a block diagram of an apparatus for determining a communication beam according to an exemplary aspect of the present disclosure.

Correspondingly, FIG. 18 is referred to. FIG. 18 is a block diagram of an apparatus for determining a communication beam according to an exemplary aspect, provided in a beam transmitting terminal. The apparatus may include: a first load detecting module 41, a first network connection response module 42 and a second network connection response module 43.

The first load detecting module 41 is configured to receive a network connection request sent from user equipment through a first beam, to determine a current load of the first beam.

The first network connection response module 42 is configured to, if the current load of the first beam exceeds a preset threshold value, reject the network connection request.

The second network connection response module 43 is configured to, if the current load of the first beam does not exceed the preset threshold value, establish a communication connection between the transmitting terminal and the user equipment through the first beam.

Figure 19:
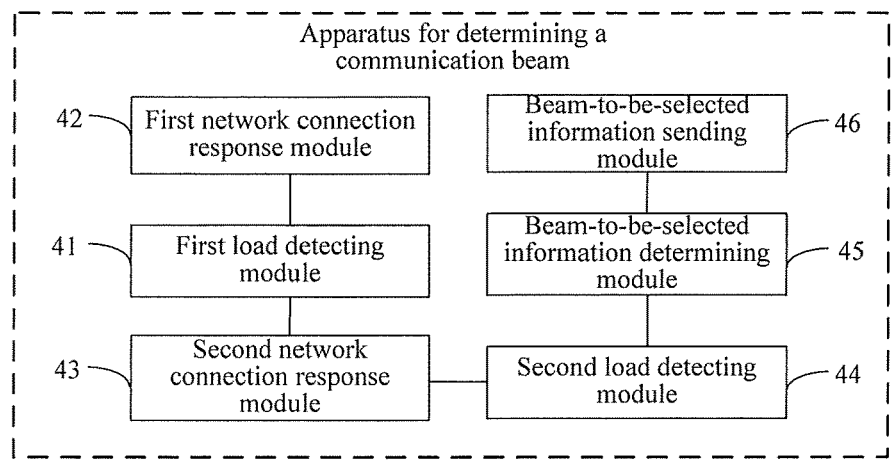
FIG. 19 is a block diagram of another apparatus for determining a communication beam according to an exemplary aspect of the present disclosure.

FIG. 19 is a block diagram of an apparatus for determining a communication beam according to an exemplary aspect. Referring to FIG. 19, on the basis of the apparatus aspect as shown in FIG. 18, the above apparatus may further include: a second load detecting module 44, a beam-to-be-selected information determining module 45, and a beam-to-be-selected information sending module 46.

The second load detecting module 44 is configured to, when a data transmission state of a user terminal through a data transmission link of the first beam is lower than a preset threshold value, detect a load condition of each beam.

The information determining module 45 of beams to be selected is configured to, acquire a set of beams to be selected consisting of a group of beam identifications of available beams according to the load condition of each beam.

The information sending module 46 of beams to be selected is configured to send the set of beams to be selected to the user equipment, such that the user equipment reselects the target beam according to the set of beams to be selected.

For the aspects regarding apparatuses, since they basically correspond to the aspects regarding methods, they may be referred to the description of the method aspects regarding methods. The aspects regarding apparatuses described above are merely illustrative. The units described as separate components may be or may not be physically separate, and the components illustrated as units may be or may not be physical units, and may be at the same location, or may be distributed to multiple units over the network. A part of or the whole of the modules can be selected to achieve the objective of the technical scheme of the present disclosure as desired. One skilled in the art may understand and practice the aspects without paying any creative labor.

Correspondingly, in one aspect, the aspect of the present disclosure provides an apparatus for determining a communication beam, including: a processor; and a memory for storing instructions executable by the processor, wherein the processor is configured to perform:

when at least two received beams are detected, acquiring beam information of the received beams;

selecting a target beam according to the beam information of the received beams; and transmitting information by using the target beam.

In another aspect, the aspect of the present disclosure provides an apparatus for determining a communication beam, including: a processor; and a memory for storing instructions executable by the processor, wherein the processor is configured to perform:

receiving a network connection request sent from user equipment through a first beam, to determine a current load of the first beam;

when the current load of the first beam exceeds a preset threshold value, rejecting the network connection request; and when the current load of the first beam does not exceed the preset threshold value, establishing a communication connection between the transmitting terminal and the user equipment through the first beam.

Figure 20:
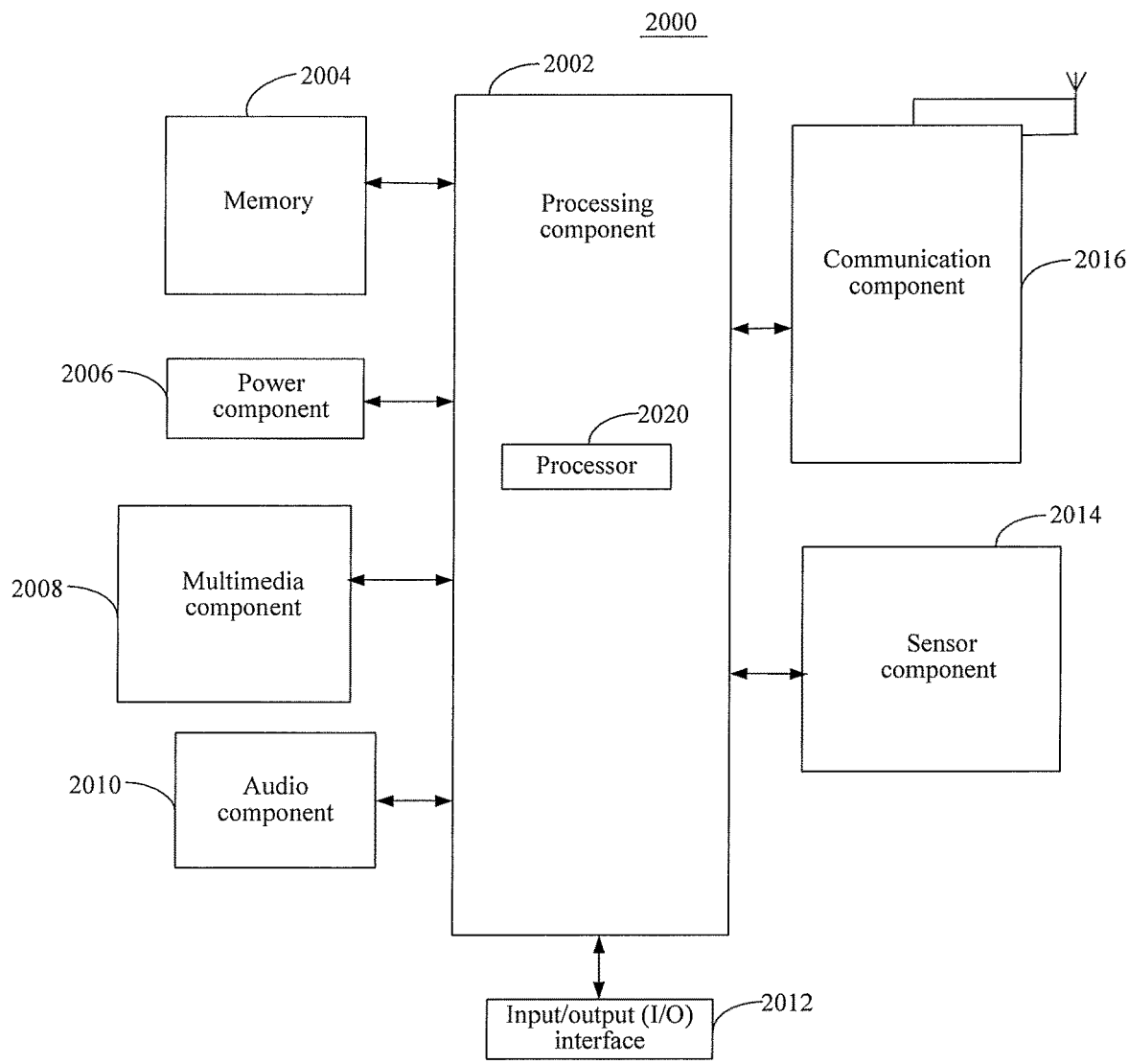
FIG. 20 is a structural schematic diagram of an apparatus for determining a communication beam according to an exemplary aspect of the present disclosure.

FIG. 20 is a structural schematic diagram of an apparatus 2000 for determining a communication beam according to an exemplary aspect. For example, the apparatus 2000 may be user equipment, specifically a mobile phone, a computer, a digital broadcast terminal, a messaging device, a gaming console, a tablet, a medical device, exercise equipment, a personal digital assistant, a wearable device such as a smart watch, smart glasses, a smart bracelet, smart running shoes and the like.

Referring to FIG. 20, the apparatus 2000 may include one or more of the following components: a processing component 2002, a memory 2004, a power component 2006, a multimedia component 2008, an audio component 2010, an input/output (I/O) interface 2012, a sensor component 2014, and a communication component 2016.

The processing component 2002 typically controls overall operations of the apparatus 2000, such as the operations associated with display, telephone calls, data communications, camera operations, and recording operations. The processing component 2002 may include one or more processors 2020 to execute instructions to perform all or part of the steps in the above described methods. Moreover, the processing component 2002 may include one or more modules which facilitate the interaction between the processing component 2002 and other components. For instance, the processing component 2002 may include a multimedia module to facilitate the interaction between the multimedia component 2008 and the processing component 2002.

The memory 2004 is configured to store various types of data to support the operation of the apparatus 2000. Examples of such data include instructions for any applications or methods operated on the apparatus 2000, contact data, phonebook data, messages, pictures, video, etc. The memory 2004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 2006 provides power to various components of the apparatus 2000. The power component 2006 may include a power management system, one or more power sources, and any other components associated with the generation, management, and distribution of power in the apparatus 2000.

The multimedia component 2008 includes a screen providing an output interface between the apparatus 2000 and the user. In some aspects, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some aspects, the multimedia component 2008 includes a front camera and/or a rear camera. The front camera and the rear camera may receive an external multimedia datum while the apparatus 2000 is in an operation mode, such as a photographing mode or a video mode. Each of the front camera and the rear camera may be a fixed optical lens system or have focus and optical zoom capability.

The audio component 2010 is configured to output and/or input audio signals. For example, the audio component 2010 includes a microphone ("MIC") configured to receive an external audio signal when the apparatus 2000 is in an operation mode, such as a call mode, a recording mode, and a voice recognition mode. The received audio signal may be further stored in the memory 2004 or transmitted via the communication component 2016. In some aspects, the audio component 2010 further includes a speaker to output audio signals.

The I/O interface 2012 provides an interface between the processing component 2002 and peripheral interface modules, such as a keyboard, a click wheel, keys, and the like. The keys may include, but are not limited to, a home key, a volume key, a starting key, and a locking key.

The sensor component 2014 includes one or more sensors to provide status assessments of various aspects of the apparatus 2000. For instance, the sensor component 2014 may detect an open/closed status of the apparatus 2000, relative positioning of components, e.g., the display and the keypad, of the apparatus 2000, a change in position of the apparatus 2000 or a component of the apparatus 2000, a presence or absence of user contact with the apparatus 2000, an orientation or an acceleration/deceleration of the apparatus 2000, and a change in temperature of the apparatus 2000. The sensor component 2014 may include a proximity sensor configured to detect the presence of nearby objects without any physical contact. The sensor component 2014 may also include a light sensor, such as a CMOS or CCD image sensor, for use in imaging applications. In some aspects, the sensor component 2014 may also include an accelerometer sensor, a gyroscope sensor, a magnetic sensor, a pressure sensor, or a temperature sensor.

The communication component 2016 is configured to facilitate communication, wired or wirelessly, between the apparatus 2000 and other devices. The apparatus 2000 may access a wireless network based on a communication standard, such as WiFi, 2G, or 3G, or a combination thereof. In one exemplary aspect, the communication component 2016 receives a broadcast signal or broadcast associated information from an external broadcast management system via a broadcast channel. In one exemplary aspect, the communication component 2016 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary aspects, the apparatus 2000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary aspects, there is also provided a non-transitory computer-readable storage medium including instructions, such as included in the memory 2004, executable by the processor 2020 in the apparatus 2000, for performing the above-described methods. For example, the non-transitory computer-readable storage medium may be a ROM, a RAM, a CD-ROM, a magnetic tape, a floppy disc, an optical data storage device, and the like.

In the aspect, when instructions in the memory 2004 are executed by the processing component 2002, the apparatus 2000 is enabled to perform the method for determining a communication beam including:

when at least two received beams are detected, acquiring beam information of the received beams;

selecting a target beam according to the beam information of the received beams; and transmitting information by using the target beam.

Figure 21:
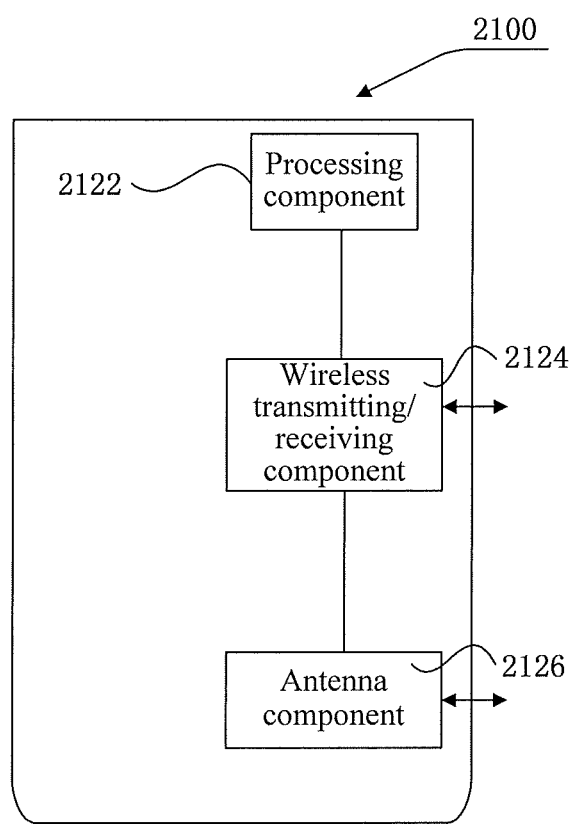
FIG. 21 is a structural schematic diagram of an apparatus for determining a communication beam according to an exemplary aspect of the present disclosure.

FIG. 21 is a structural schematic diagram of an apparatus 2100 for determining a communication beam according to an exemplary aspect. As shown in FIG. 21, the apparatus 2100 may be provided as a base station. Referring to FIG. 21, the apparatus 2100 includes a processing component 2122, a wireless transmitting/receiving component 2124, an antenna component 2126, and a signal processing section specific to a wireless interface. The processing component 2122 may further include one or more processors.

One processor among the processing component 2122 may be configured to perform:

receiving a network connection request sent from user equipment through a first beam, to determine a current load of the first beam;

if the current load of the first beam exceeds a preset threshold value, rejecting the network connection request; and if the current load of the first beam does not exceed the preset threshold value, establishing a communication connection between the transmitting terminal and the user equipment through the first beam.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for determining a communication beam, comprising:

receiving, via a user equipment, at least two beams;

acquiring beam information of the received beams, wherein the beam information of the received beams is acquired under at least one of following triggering conditions:

when the user equipment is ready to access a network;

when the user equipment is in an idle state;

when the user equipment receives beam scheduling information sent by a transmitting terminal of a first beam in case of accessing a network through the first beam; and when a signal intensity of a first beam is lower than a preset intensity threshold value, or when a signal descending rate of a first beam is higher than a preset rate threshold value, in case of the user equipment accessing a network through the first beam, wherein acquiring the beam information of the received beams comprises:

acquiring a signal intensity and a beam identification of each of the received beams, wherein the beam identification of each of the received beams is determined based on a frequency or a wavelength of each respective one of the received beams, arranging the signal intensities of the received beams in a preset order, and generating an intensity order list based on the arranged signal intensities;

selecting a target beam from the received beams based on the beam information by:
  determining current state information of the user equipment, wherein, when the user equipment selects a first beam with a currently strongest signal based on the intensity ordered list to connect to a network, determining the current state information of the user equipment includes determining network connection state information of the user equipment;
  determining priorities of the received beams based on the current state information of the user equipment and the intensity ordered list, wherein, when the network connection state information indicates that network access fails, determining priorities of the received beams includes determining a second beam with a signal intensity second only to the first beam as the received beam with the highest priority based on the intensity ordered list, and when the first beam is still a received beam with a currently strongest signal, determining priorities of the received beams includes rejecting the first beam as the received beam with the highest priority within a preset time range; and
  selecting one of the received beams with a highest priority as the target beam; and
transmitting information via the target beam.

2. The method according to claim 1, wherein selecting the target beam further comprises:
  selecting one of the received beams with a largest signal intensity as the target beam based on the intensity ordered list.

3. An apparatus for determining a communication beam, comprising:
  a processor; and
  a memory for storing instructions executable by the processor,
  wherein the processor is configured to:
    receive, via a user equipment, at least two beams;
    acquire beam information of the received beams,
    wherein the processor is further configured to acquire the beam information of the received beams under at least one of following triggering conditions:
      when the user equipment is ready to access a network;
      when the user equipment is in an idle state;
      when the user equipment receives beam scheduling information sent by a transmitting terminal of a first beam in case of accessing a network through the first beam; and
      when a signal intensity of a first beam is lower than a preset intensity threshold value, or when a signal descending rate of a first beam is higher than a preset rate threshold value, in case of the user equipment accessing a network through the first beam,
    wherein when acquiring the beam information of the received beams, the processor is further configured to:
      acquire a signal intensity and a beam identification of each of the received beams, wherein the beam identification of each of the received beams is determined based on a frequency or a wavelength of each respective one of the received beams,
      arrange the signal intensities of the received beams in a preset order, and
      generate an intensity order list based on the arranged signal intensities;
    select a target beam from the received beams based on the beam information of the received beams by:
      determining current state information of the user equipment, wherein, when the user equipment selects a first beam with a currently strongest signal based on the intensity ordered list to connect to a network, determining the current state information of the user equipment includes determining network connection state information of the user equipment;
      determining priorities of the received beams based on the current state information of the user equipment and the intensity ordered list, wherein, when the network connection state information indicates that network access fails, determining priorities of the received beams includes determining a second beam with a signal intensity second only to the first beam as the received beam with the highest priority based on the intensity ordered list, and when the first beam is still a received beam with a currently strongest signal, determining priorities of the received beams includes rejecting the first beam as the received beam with the highest priority within a preset time range; and
      selecting one of the received beams with a highest priority as the target beam; and
    transmit information via the target beam.

4. The apparatus according to claim 3, wherein when selecting the target beam, the processor is further configured to:
  select one of the received beams with a largest signal intensity as the target beam based on the intensity ordered list.

* * * * *